United States Patent
Muhanna et al.

(10) Patent No.: US 9,426,719 B2
(45) Date of Patent: **\*Aug. 23, 2016**

(54) ANCHORING SERVICES OF A MOBILE STATION ATTACHED TO A FIRST SERVICE DOMAIN AT A HOME AGENT IN A SECOND SERVICE DOMAIN

(71) Applicant: Microsoft Technology Licensing, LLC, Redmond, WA (US)

(72) Inventors: Ahmad Muhanna, Richardson, TX (US); Barnaba Barnowski, Calgary (CA); Eric Parsons, Stittsville (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,645

(22) Filed: Apr. 21, 2015

(65) Prior Publication Data

US 2015/0230151 A1 Aug. 13, 2015

Related U.S. Application Data

(63) Continuation of application No. 13/055,260, filed as application No. PCT/US2009/051393 on Jul. 22, 2009, now Pat. No. 9,042,297.

(60) Provisional application No. 61/083,413, filed on Jul. 24, 2008.

(51) Int. Cl.
H04W 40/24 (2009.01)
H04W 8/04 (2009.01)

(Continued)

(52) U.S. Cl.
CPC ............... *H04W 40/24* (2013.01); *H04W 8/04* (2013.01); *H04W 80/04* (2013.01);

(Continued)

(58) Field of Classification Search
CPC ..... H04W 40/24; H04W 80/04; H04W 88/06; H04W 88/182; H04L 61/2015
See application file for complete search history.

(56) References Cited

U.S. PATENT DOCUMENTS 8,165,574 B2    4/2012  Hallenstal et al.
9,042,297 B2    5/2015  Muhanna et al.

(Continued)

FOREIGN PATENT DOCUMENTS

JP    2002223236    8/2002
JP    2005136659    5/2005

(Continued)

OTHER PUBLICATIONS

"Decision to Grant", JP Application No. 2011-520161, Oct. 15, 2013, 4 Pages.

(Continued)

*Primary Examiner* — Un C Cho
*Assistant Examiner* — Peian Lou
(74) *Attorney, Agent, or Firm* — Judy Yee; Micky Minhas

(57) ABSTRACT

A first node receives information associated with a mobile station to allow for establishment of a session for the mobile station that is attached to a first wireless access network in a first service domain. In response to the received information, the first node sends messaging to a home agent in a second service domain that is of a different type than the first service domain. The first node receives, from the home agent, an Internet Protocol (IP) address allocated to the mobile station in the second service domain, where the IP address is allocated in response to the messaging, and where services provided to the mobile station are anchored in the second service domain.

20 Claims, 4 Drawing Sheets

(51) Int. Cl.
   *H04W 80/04* (2009.01)
   *H04W 88/18* (2009.01)
   *H04L 29/12* (2006.01)
   *H04W 8/26* (2009.01)
   *H04W 36/00* (2009.01)
   *H04W 76/02* (2009.01)
   *H04W 88/06* (2009.01)
   *H04W 92/24* (2009.01)
   *H04W 92/02* (2009.01)
   *H04W 36/12* (2009.01)

(52) U.S. Cl.
   CPC ........ *H04W 88/182* (2013.01); *H04L 61/2007* (2013.01); *H04L 61/2015* (2013.01); *H04W 8/26* (2013.01); *H04W 36/0022* (2013.01); *H04W 36/12* (2013.01); *H04W 88/06* (2013.01); *H04W 92/02* (2013.01); *H04W 92/24* (2013.01)

(56) References Cited

U.S. PATENT DOCUMENTS

| | | | |
|---|---|---|---|
| 2003/0067923 | A1 | 4/2003 | Ju et al. |
| 2006/0274696 | A1 | 12/2006 | Krishnamurthi |
| 2007/0254661 | A1 | 11/2007 | Chowdhury et al. |
| 2007/0291678 | A1 | 12/2007 | Chowdhury et al. |
| 2008/0160994 | A1 | 7/2008 | Ala-Vannesluoma et al. |
| 2008/0176560 | A1 | 7/2008 | Dutta et al. |
| 2009/0010206 | A1 | 1/2009 | Giaretta et al. |
| 2010/0246509 | A1 | 9/2010 | Chen |
| 2011/0122824 | A1 | 5/2011 | Muhanna et al. |

FOREIGN PATENT DOCUMENTS

| | | |
|---|---|---|
| JP | 2009542095 A | 11/2009 |
| JP | 2011520161 | 7/2011 |
| KR | 100383587 | 2/2003 |
| KR | 100625240 | 6/2006 |
| KR | 100617795 B1 | 8/2006 |
| KR | 1020070034019 A | 3/2007 |
| KR | 1020070089377 A | 8/2007 |
| WO | 2006093392 A1 | 9/2006 |
| WO | WO-2007149420 | 12/2007 |
| WO | WO-2008018151 | 2/2008 |
| WO | WO-2008084392 | 7/2008 |

OTHER PUBLICATIONS

"Final Office Action", U.S. Appl. No. 13/055,260, Aug. 2, 2013, 21 pages.
"Foreign Notice of Allowance", CN Application No. 200980128848.X, Nov. 15, 2014, 6 Pages.
"Foreign Office Action", CN Application No. 200980128848.X, Feb. 20, 2013, 27 pages.
"Foreign Office Action", CN Application No. 200980128848.X, Jun. 24, 2014, 7 pages.
"Foreign Office Action", CN Application No. 200980128848.X, Feb. 8, 2014, 14 pages.
"Foreign Office Action", JP Application No. 2011-520161, Apr. 23, 2013, 5 Pages.
"Foreign Office Action", JP Application No. 2013-257931, Oct. 28, 2014, 4 Pages.
"Foreign Office Action", KR Application No. 10-2014-7021033, Oct. 22, 2014, 5 Pages.
"International Search Report", Application No. PCT/US2009/051393, Mar. 3, 2010, 4 pages.
"Non-Final Office Action", U.S. Appl. No. 13/055,260, Feb. 22, 2013, 16 pages.
"Non-Final Office Action", U.S. Appl. No. 13/055,260, Mar. 13, 2014, 22 pages.
"Notice of Allowance", U.S. Appl. No. 13/055,260, Jan. 14, 2015, 16 pages.
"Supplemental Notice of Allowance", U.S. Appl. No. 13/055,260, Mar. 23, 2015, 2 pages.
Office Action with English translation dated Aug. 26, 2015 in Korean Patent Application No. 10-2014-7021033, 3 pages.
Notice of Allowance with English translation dated Mar. 17, 2016 in Korean Patent Application No. 10-2015-7033680, 3 pages.
Notice of Allowance with English translation of allowed claims dated Jun. 30, 2015 in Japanese Patent Application No. 2013-257931, 4 pages.
Search Report dated Apr. 15, 2016 in European Patent Application No. 09800936.8, 10 pages.
"3rd Generation Partnership Project; Technical Specification Group Services and System Aspects; Architecture Enhancements for Non-3GPP Accesses (Release 8)", Jun. 1, 2008, in 3rd Generation Partnership Project, Mobile Competence Centre, 181 Pages.
"E-UTRAN—HRPD Connectivity and Interworking: Core Network Aspects", In 3rd Generation Partnership Project 2, vol. TSGX, Jul. 21, 2008, 42 Pages.

ANCHORING SERVICES OF A MOBILE STATION ATTACHED TO A FIRST SERVICE DOMAIN AT A HOME AGENT IN A SECOND SERVICE DOMAIN

RELATED APPLICATIONS

This application is a continuation of and claims priority to U.S. patent application Ser. No. 13/055,260 filed Jan. 21, 2011, published as US 2011-0122824 on May 26, 2011 and issued as U.S. Pat. No. 9,042,297 on May 26, 2015, which is a National Stage Entry and claims priority to PCT Application No. PCT/US2009/051393 filed Jul. 22, 2009, published as WO 2010/011740 on Jan. 28, 2010, which claims the benefit of priority from U.S. Provisional Application No. 61/083,413, filed Jul. 24, 2008, the disclosures of which are incorporated by reference herein in their entirety.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network.

Dual-mode mobile stations can perform access using different types of wireless access networks, such as a legacy HRPD (High Rate Packet Data) wireless access network (as defined by CDMA 2000) or a E-UTRAN (Evolved UMTS Terrestrial Radio Access Network, as defined by 3GPP). The E-UTRAN wireless access network allows for access of 4G (fourth generation) wireless services, such as those provided by LTE.

As service operators evolve from legacy wireless access networks to 4G networks, such service operators typically have to support subscriber access at both types of networks. When a mobile station (such as a dual mode mobile station) attaches to an E-UTRAN wireless access network, for example, services provided in the legacy network may no longer be available to the mobile station.

SUMMARY

In general, a technique or mechanism is provided to allow anchoring of the services in a home network of the mobile station even when the mobile station is attached to a wireless access network of a different service domain.

Other or alternative features will become apparent from the following description, from the drawings, and from the claims.

DETAILED DESCRIPTION

Figure 1:
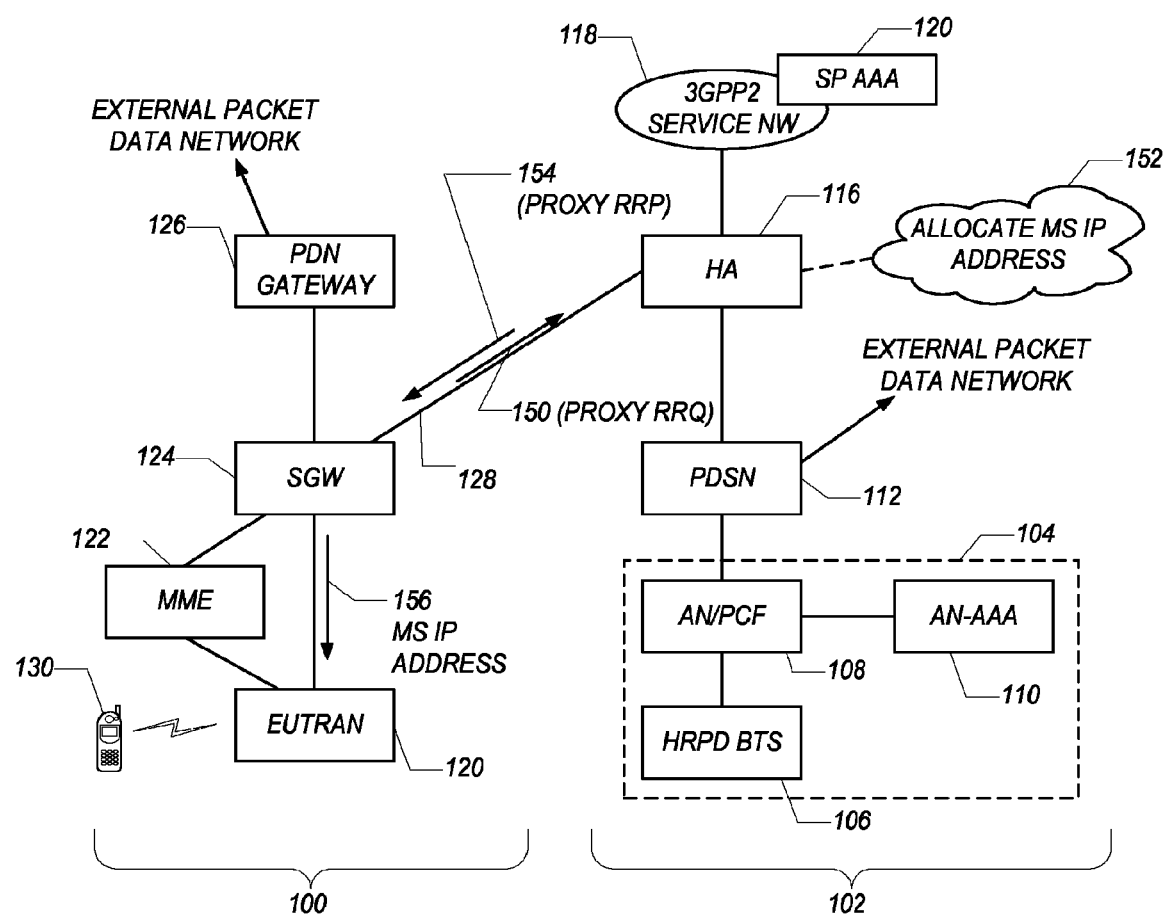
FIGS. 1-3 illustrate portions of different networks in accordance with one or more embodiments.

In the following description, numerous details are set forth to provide an understanding of some embodiments. However, it will be understood by those skilled in the art that some embodiments may be practiced without these details and that numerous variations or modifications from the described embodiments may be possible.

Various services can be provided to a mobile station by a home service domain of the mobile station. Examples of such services include an accounting/billing service; a gaming service; a push-to-talk service; an instant conferencing or messaging service; a calendaring service; a location-based service (e.g., find the nearest store or other location); a presence service (e.g., service that follows the subscriber's movements); broadcast and multicasting services (e.g., relating to Internet TV); and so forth.

Thus, when the mobile station is attached to a wireless access network of the mobile station's home service domain, such services can be provided to the mobile station. In one example embodiment, the home service domain of the mobile station includes an HRPD (High Rate Packet Data) wireless access network, as defined by 3GPP2, to support wireless access by the mobile station. The HRPD wireless access network is considered to be a legacy wireless access network. The home service domain in this example is considered a legacy service domain that supports services according to an older standard, such as the 3GPP2 CDMA 2000 standard. A "service domain" refers to an arrangement of network nodes associated with one or more service operators to provide wireless access and other services to a mobile station.

New wireless technologies are being developed, with one such new technology 10 being the Long Term Evolution (LTE) technology from 3GPP. The LTE network uses E-UTRAN as the wireless access technology for the mobile station to access the LTE network. In this example, LTE defines a second service domain that is of a different type than the home (or legacy) service domain.

Although reference is made to the HRPD and LTE standards above, it is noted that in alternative embodiments other types of service domains can be employed.

An issue associated with a mobile station that is attached to the E-UTRAN wireless access network is that the mobile station tends to follow LTE procedures and protocols, which may cause the mobile station to be anchored at a node in the LTE service domain. However, anchoring the mobile station in the LTE service domain means that the mobile station may no longer be able to access various services provided by the home service domain.

In accordance with some embodiments, to address the foregoing issue, a mechanism is provided to anchor a session of the mobile station at a node in the home service domain of the mobile station, even if the mobile station is attached to the E-UTRAN wireless access network (in a different service domain). By anchoring the mobile station at the node in the home service domain, services of the home service domain can be made available to the mobile station even though the mobile station is located in a different service domain.

In some embodiments, the node of the home service domain at which the session of the mobile station is anchored is a home agent as defined by either Proxy Mobile IPv4 (Internet Protocol version 4) or Proxy Mobile IPv6 (Internet Protocol version 6). Proxy Mobile IPv6 is defined by Request for Comments (RFC) 5213, entitled "Proxy Mobile IPv6," dated August 2008. Proxy Mobile IPv4 is defined by K. Leung et al., Internet-Draft, entitled "WiMAX Forum/3GPP2 Proxy Mobile IPv4," draft-leung-mip4-proxy-mode-10.txt, dated November 2008.

A home agent, as defined by Mobile IPv4 or IPv6, is a router on a mobile station's home network with which the mobile station has registered its current care-of address. In Proxy Mobile IPv6, the functionality of the home agent is provided in a local mobility anchor (LMA), which provides the functionalities of the home agent, as well as additional capabilities for supporting the Proxy Mobile IPv6 protocol. Thus, as used here, "home agent" refers to either a Mobile IP home agent or a Proxy Mobile IPv6 local mobility anchor.

Various different embodiments for anchoring the services of the mobile station at the home agent of the mobile station while the mobile station is attached to a different service domain are provided. FIG. 1 illustrates a first solution according to an embodiment. In FIG. 1, two service domains are illustrated, including an LTE service domain 100 and a legacy service domain 102. In the example of FIG. 1, the legacy service domain 102 uses HRPD wireless access technology with a core network defined by 3GPP2.

In the legacy service domain 102, a wireless access network 104 includes an HRPD base transceiver station (BTS) 106, and an access network (AN) node 108 that is attached to an AAA (authentication, authorization, and accounting) server 110 for performing authentication, authorization, and accounting tasks when a mobile station attaches to the wireless access network 104.

The wireless access network 104 is connected to a PDSN (packet data serving node) 112 that provides access to an external packet data network such as the Internet, an intranet, or an application server. The PDSN 112 is a component of the CDMA 2000 network, and acts as a connection point between a wireless access network and the external packet data network.

The legacy service domain 102 also includes a home agent (HA) 116, which enables the creation and maintenance of a binding between a mobile station's home address and its care-of address (the address used by the mobile station when it is attached to a visited network). The home agent manages the services provided to the mobile station, including 3GPP2 services provided by a 3GPP2 service network 118. The 3GPP2 service network includes a service provider AAA server 120 to perform authentication, authorization, and accounting services when services of the 3GPP2 service network 118 are accessed by a mobile station.

The LTE service domain 100 includes an E-UTRAN wireless access network 120 to allow for wireless access by mobile stations, including a mobile station 130. In addition, the LTE service domain 100 includes a serving gateway (SGW) that routes and forwards user data packets to a PDN (packet data network) gateway 126. The PDN gateway 126 provides connectivity from the mobile station to an external packet data network by being the point of exit and entry of data traffic for the mobile station. The serving gateway is the anchor point for intra-3GPP mobility, as the mobile station 130 moves to different access points in the E-UTRAN wireless access network 120 that causes different SGWs to be selected.

The terms "serving gateway" and "packet data network gateway" can also be applied to other types of service domains (other than the LTE service domain). More generally, a packet data network gateway can refer to any point that establishes connectivity between a service domain and an external packet data network. A serving gateway can refer to any node that manages mobility of a mobile station within a service domain.

Another entity in the LTE service domain 100 is a mobility management entity (MME) 122, which is a control node that provides various control services for a mobile station. Examples of such services include tracking the mobile station, providing a paging procedure for the mobile station, and so forth. The MME 122 is also involved in bearer activation and deactivation process, and is responsible for choosing the SGW for the mobile station at the time that the mobile station initially attaches to the E-UTRAN wireless access network 120.

In accordance with the embodiment shown in FIG. 1, a link 128 is provided between the SGW 124 and the home agent 116 to allow the mobile station 130 attached to the E-UTRAN wireless access network 120 to be anchored by the home agent 116 (rather than be anchored at a node in the LTE domain 100). In this manner, the 3OPP2 services provided by network 118 in the legacy service domain 102 can continue to be available to the mobile station 130 that is attached to the E-UTRAN wireless access network 120.

There are two contexts in which the mobile station 130 can be anchored by the home agent 116 of the legacy service domain 102. In a first context, the mobile station 130 is a dual mode mobile station that is able to attach either to the HRPD wireless access network 104 of the legacy service domain 102, or to the E-UTRAN wireless access network 120 of the LTE service domain 100. In a second context, the mobile station 130 can be an LTE-only mobile station that is able to attach only to the E-UTRAN wireless access network 120.

When the mobile station 130 initially attaches to the E-UTRAN wireless access network 120, the mobile station 130 performs access authentication based on E-UTRAN access procedures. As part of this access authentication process, the SGW 124 receives user information, including the home agent IP address (the IP address of the home agent 116) associated with the mobile station 130. Other parameters of the user information received by the SGW 124 can include a user NAI (network access identifier), supported APNs (access point names, which are names used to identify bearer services), a user profile, mobility security association parameters, and so forth.

Upon receipt of the user information, the SGW 124 sends (at 150) a registration request, which can be a proxy RRQ (registration request) as defined by Proxy Mobile IPv4, on behalf of the mobile station 130 to the home agent 116 over the link 128 between the SGW 124 and home agent 116. Note that the SGW 124 has the IP address of the home agent 116 since the SGW 124 has received the IP address of the home agent as part of the mobile station access authentication process. Upon receipt of the proxy RRQ from the SGW 124 over the link 128 (which can be a link that supports proxy mobile IPv4), the home agent 116 registers the mobile station's session. In addition, the home agent 116 allocates (at 152) an IP address for the session that the mobile station can use.

The home agent 116 then sends (at 154) a registration response message (e.g., proxy RRP) back to the SGW 124 over the link 128. The proxy RRP message contains the allocated IP address for the mobile station. In response to the proxy RRP message, the SGW 124 follows the E-UTRAN access procedures to deliver (at 156) the IP address to the mobile station 130 through the E-UTRAN wireless access network 120.

It is noted that from the perspective of the home agent 116, the SGW 124 appears to be a PDSN similar to PDSN 112 in the legacy service domain 102.

Whenever the mobile station moves across E-UTRAN wireless access network 120 (e.g., moves between different base stations), it is possible that a transfer from a source SGW to a target SGW would have to be performed. For an inter-SOW transfer, the system according to some embodiments ensures that the target SGW will receive the IP address of the mobile station's home agent (116), such that the target SGW can issue a proxy RRQ to the home agent 116 to cause the home agent 116 to assign the same IP address to the mobile station to maintain mobility and access to the 3GPP2 services infrastructure.

Figure 2:
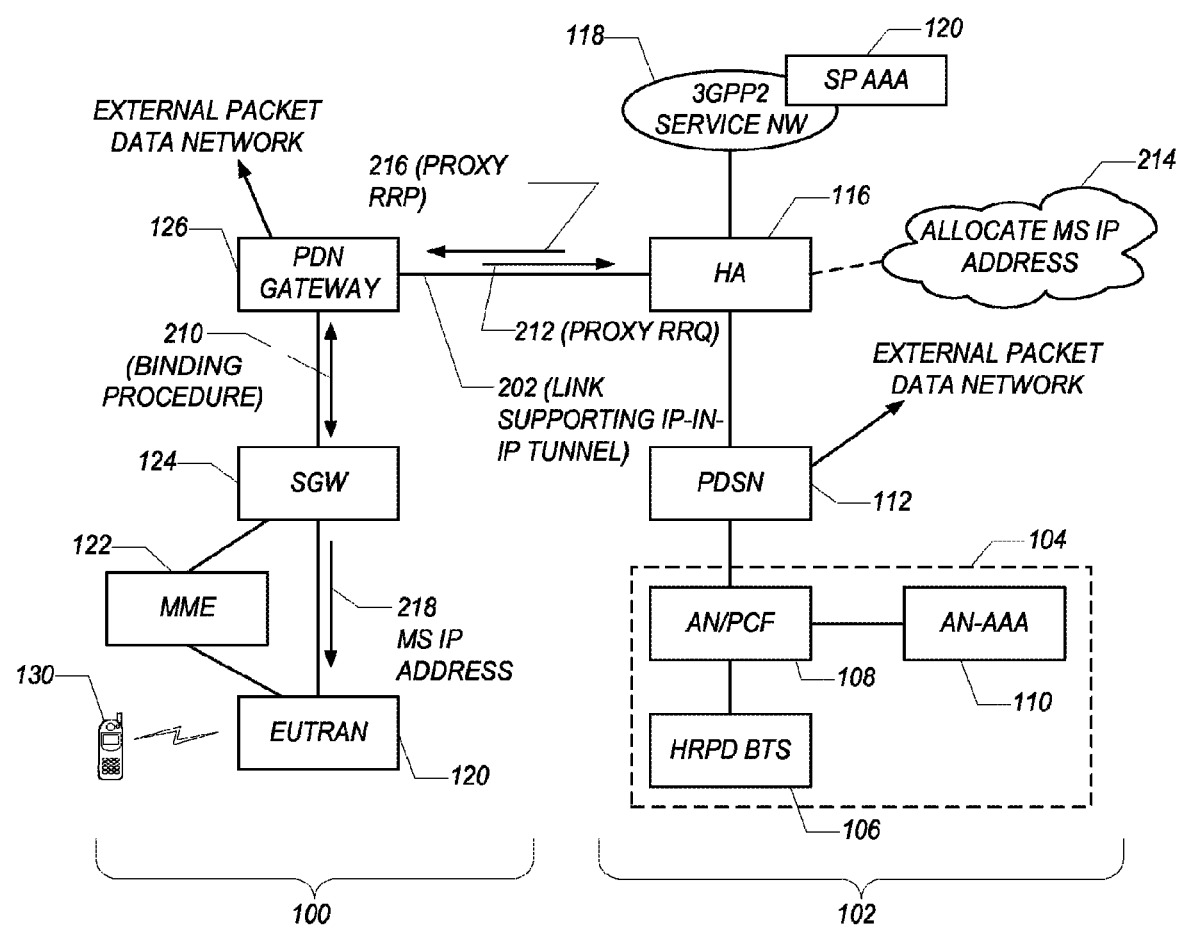

FIG. 2 illustrates an arrangement that supports at least one other embodiment. In this second embodiment, instead of establishing a link 128 (FIG. 1) between the SGW 124 and the home agent 116, a link 202 is established between the PDN gateway 126 and the home agent 116. The nodes illustrated in FIG. 2 are the same nodes as illustrated in FIG. 1. The link 202 supports Proxy Mobile IPv4 and IP-in-IP tunneling between the PDN gateway 126 and the home agent 116. IP-in-IP tunneling refers to encapsulating one IP packet in the payload of another IP packet.

In the second solution that employs the arrangement of FIG. 2, the PDN gateway 126 supports proxy Mobile IPv4 mobile access gateway (MAG) or proxy mobility agent (PMA) functionality. PMA manages the mobility related signaling for a mobile station that is attached to the MAG. The MAG performs mobility management on behalf of the mobile station. The MAG also tracks the mobile station's movements so that handover between the MAG and another MAG can be performed when the mobile station crosses between coverage areas of the respective MAGs.

After the mobile station performs access authentication based on E-UTRAN access procedures, the SGW 124 receives the user information including the IP address of the PDN gateway 126 and other parameters as discussed above in connection with FIG. 1. Upon receiving such information, the SGW 124 follows 3GPP procedures to establish an IP session for the mobile station at the PDN gateway 126. This can be accomplished by using a binding procedure (210) as defined by Proxy Mobile IPv6, such as by sending a proxy binding update (PBU) message that requests an IP address for the mobile station.

When the PDN gateway 126 receives the proxy binding update message, the PDN gateway 126 either by using out-of-band signaling or static configuration, finds the IP address of the home agent that is supposed to anchor the IP session for the mobile station. Out-of-band signaling can be performed by accessing an AAA server to select the home agent. Alternatively, the PDN gateway 126 may be provided with multiple home agents from which the PDN gateway 126 can make a selection (for load balancing purposes). As yet another alternative, static configuration is provided, where the PDN gateway 126 has to use a particular home agent.

Upon obtaining the IP address of the home agent 116, the PDN gateway 126 sends (at 212) a proxy RRQ message to the home agent 116 to allocate an IP address to the mobile station and to create a binding for the user session to a proxy care-of-address (CoA) that is terminated at the PDN gateway 126.

When the home agent 116 receives the proxy RRQ message, the home agent 116 validates the proxy RRQ message and if successful, the home agent 116 will allocate (at 214) an IP address for the session that is returned (at 216) to the PDN gateway 126 in a proxy RRP message. The home agent 116 also creates a binding for the user, its home address, and the proxy care-of-address that belongs to the PDN gateway 126.

When the PDN gateway 126 receives the proxy RRP message from the home agent 116 with the IP address of the mobile station included, the PDN gateway 126 sends a proxy binding acknowledgement (PBA) to the SGW 124 (as part of the binding procedure 210) with the assigned home IP address, along with other parameters such as the IPv6 home network prefix (HNP). The HNP is assigned to an interface of a mobile station to the Proxy Mobile IP domain, and the HNP can be used to derive an address of the interface.

The PDN gateway 126 updates a mobile station's current BCE (binding cache entry) with the home agent IP address. It is possible to create a separate binding that is linked to the mobile station's proxy BCE.

When the SGW 124 receives the proxy binding acknowledgment message from the PDN gateway 126, the SGW 124 delivers (at 218) the IP address and possibly the home network prefix to the mobile station 130 following E-UTRAN access procedures.

It is noted that from the perspective of the home agent 116, the PDN gateway 126 appears to be a PDSN similar to PDSN 112 in the legacy service domain 102.

Whenever the mobile station moves across the E-UTRAN wireless access network 120 that causes an inter-SGW transfer, the system ensures that the target SGW will receive the IP address of the current PDN gateway 126 that maintains a binding of the mobile station 130 to its current home agent. The target SGW will initiate the procedure discussed above, which causes the home agent 116 to assign the same IP address to the mobile station 130 to maintain IP mobility and connectivity using the same IP address.

If the mobile station 130 moves to the HRPD wireless access network 104 from the E-UTRAN wireless access network 120, the system will provide the PDSN 112 with the address of the current home agent 116 that maintains and anchors the IP session of the mobile station 130. When the PDSN 112 subsequently sends a proxy RRQ to the home agent 116, the home agent 116 updates the mobile station binding with the new proxy care-of-address to point to the PDSN 112 instead of the PDN gateway 126.

Figure 3:
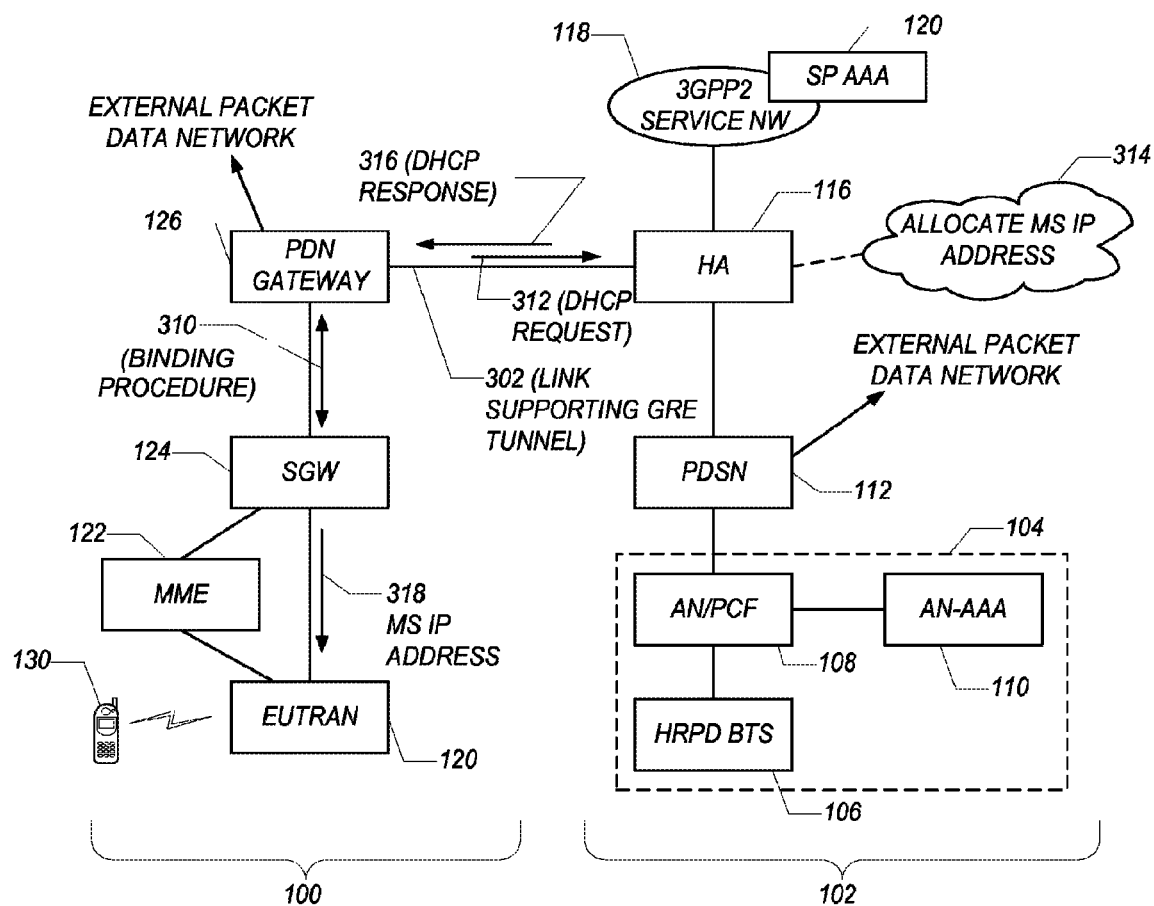

In accordance with at least one other embodiment, as illustrated in FIG. 3, a GRE (Generic Routing Encapsulation) tunnel is employed over a link 302 between the PDN gateway 126 and the home agent 116. GRE is a tunneling protocol that can encapsulate various network layer protocol packet types inside IP tunnels to create virtual point-to-point links. GRE is described in RFC 2784, entitled "Generic Routing Encapsulation (GRE)," dated March 2000, as updated by RFC 2890, entitled "Key and Sequence Number Extensions to GRE," dated September 2000.

In some implementations, DHCP (Dynamic Host Configuration Protocol) functionality is supported by the PDN gateway 126 and home agent 116 to support the solution according to this embodiment. DHCP is a network application protocol used by devices (referred to as DHCP clients) to obtain configuration information regarding the DHCP client from a DHCP server. DHCP for IPv4 networks is described in RFC 2131, entitled "Dynamic Host Configuration Protocol," dated March 1997. DHCP for IPv6 networks is described in RFC 3315, entitled "Dynamic Host Configuration Protocol for IPv6 (DHCPv6)," dated July 2003.

The PDN gateway 126 supports DHCP client functionality, while the home agent 116 supports DHCP relay functionality or DHCP server functionality. Since the DHCP client and server functionality between the PDN gateway 126 and the home agent 116 are not visible to the outside world, vendor-specific information can be communicated between the PDN gateway 126 and the home agent 116 using the DHCP protocol, such as GRE keys.

As with the embodiments associated with FIGS. 1 and 2, due to access authentication by the mobile station based on E-UTRAN access procedures, the SGW 124 receives user information, including the IP address of the PDN gateway 126, along with other parameters such as user NAI, supported APNs, the user profile, and so forth. When the SGW 124 receives such information, including the IP address of the PDN gateway 126, the SGW follows 3GPP procedures to establish an IP session for the mobile station at the PDN gateway 126. For example, this can be accomplished by using a binding procedure (310) that includes sending a proxy binding update message (according to Proxy Mobile IPv6) to the PDN gateway 126 to request an IP address (and possibly an IPv6 home network prefix).

Upon receiving the proxy binding update message from the SGW 124, the PDN gateway 126 using out-of-band signaling or static configuration is able to find the IP address of the home agent 116 that is supposed to anchor the IP session of the mobile station. The PDN gateway 126 identifies the static GRE tunnel over the link 302 that is used to communicate with the home agent 116. If no GRE tunnel exists, the PDN gateway 126 will initiate establishment of the GRE tunnel.

Next, the PDN gateway 126 sends (at 312) a DHCP request to the home agent 116 on the GRE tunnel. The DHCP request includes the user identity and an IP address allocation request. Optionally, the DHCP request may also include a request for a GRE key in case IP private address overlapping is supported.

When the home agent 116 receives the DHCP request, the home agent either allocates (at 314) the IP address locally (as part of DHCP server functionality) or uses DHCP relay functionality to obtain the information from another DHCP server to allocate the IP address for the mobile station.

When the IP address of the mobile station is allocated, the home agent 116 maintains a binding of the user NAI and the mobile station's home IP address, and the GRE tunnel interface (the PDN gateway 126 that sent the DHCP request) that this session/IP address belongs to.

The home agent 116 then sends (at 316) a DHCP response that is responsive to the DHCP request sent at 312. When the PDN gateway 126 receives the DHCP response, the PDN gateway 126 updates the mobile station's BCE with the newly allocated IP address, and the home agent IP address is updated with the current GRE tunnel interface.

In response to the proxy binding update message from the SGW 124, the PDN gateway 126 sends a proxy binding acknowledgment message (part of the binding procedure 310) to the SGW 124 with the assigned home IP address and other parameters (including possibly the IPv6 home network prefix). Upon receiving the proxy binding acknowledgment message from the PDN gateway 126, the SGW 124 delivers (at 318) the allocated IP address (and possibly the home network prefix) to the mobile station, using E-UTRAN access procedures.

In case the mobile station moves across cells in the E-UTRAN wireless access network 120 such that an inter-SGW transfer occurs, the target SGW will receive the current mobile station's PDN gateway IP address to maintain a binding of the mobile station with its home agent. The home agent will assign the same IP address to the same mobile station to maintain IP mobility and connectivity using the same IP address.

If the mobile station moves to the HRPD access network 104, the system will provide the PDSN 112 with the current home agent that maintains and anchors the mobile station's IP session. When the PDSN 112 sends a proxy RRQ message to the home agent 116, the home agent 116 validates the list of mobile station bindings including those established over the GRE tunnel with the PDN gateway 126 using the DHCP protocol. If the same user NAI is already assigned to the IP address, the home agent 116 updates the mobile station binding with the new proxy care-of-address to point to the PDSN 112 instead of the PDN gateway 126.

Figure 4:
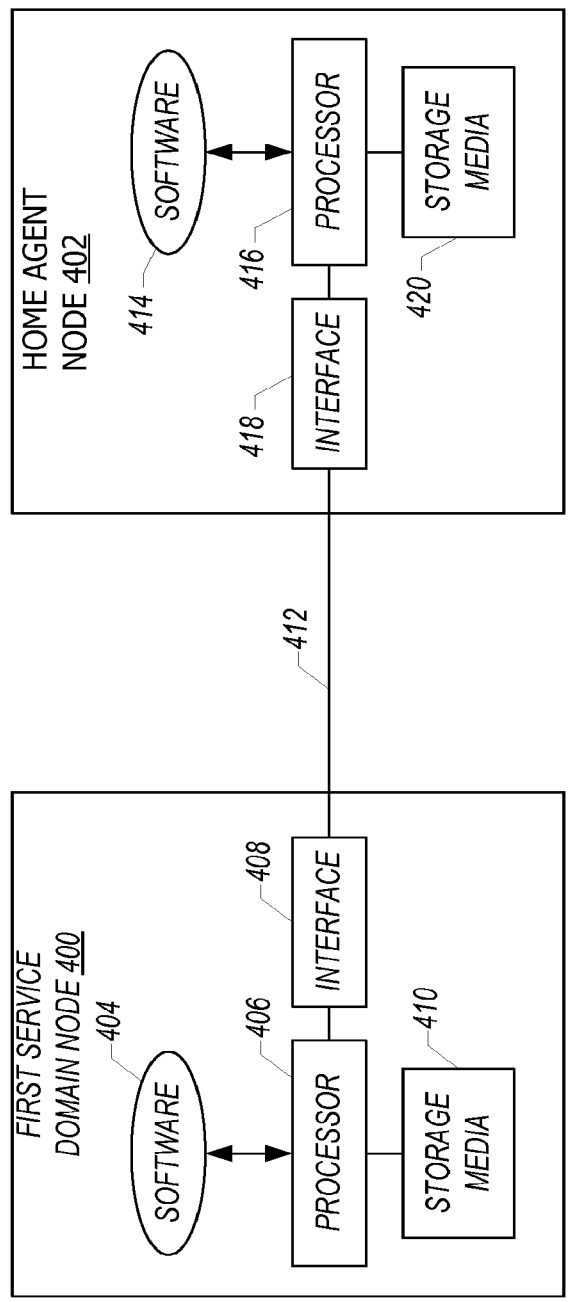
FIG. 4 is a block diagram of components in a node of a first service domain and a home agent node in a second service domain, according to one or more embodiments.

FIG. 4 is a block diagram of nodes that are part of the networks depicted in FIGS. 1-3. A first service domain node 400 can be a node in the LTE service domain 100, and the home agent node 402 is a node that contains the home agent 116 of FIGS. 1-3. A "node" refers to any computing/processing assembly. For example, the first service domain node 400 can be either the SGW 124 or PDN gateway 126 of FIGS. 1-3.

In the example of FIG. 4, the first service domain node 400 includes software 404 executable on a processor 406. The software 404 includes various software modules that perform tasks of the SGW 124 and/or PDN gateway 126 discussed above. The processor is connected to a storage media 410, and an interface 408 that allows the first service domain node 400 to communicate with the home agent node 402.

The home agent node 402 includes software 414 executable on a processor 416 to perform various tasks of the home agent 116 discussed above. The processor 416 is connected to a storage media 420 and an interface 418 to allow the home agent node 402 to communicate with the first service domain node 400.

Instructions of the software 404 and 414 can be loaded from respective storage media 410 and 420 for execution on the processors 406 and 416, respectively. A processor includes microprocessors, microcontrollers, processor modules or subsystems (including one or more microprocessors or microcontrollers), or other control or computing devices. A "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of one or more embodiments. However, it will be understood that alternate embodiments may be practiced without these details. While various embodiments have been discussed, those skilled in the art will appreciate numerous modifications and variations therefrom. It is intended that the appended claims cover such modifications and variations.

What is claimed is:

1. A method to enable a mobile station operating in a first service domain to access one or more services anchored in a second service domain, the method performed by a packet data network (PDN) gateway associated with the first service domain, the method comprising:

sending, to a home agent, messaging associated with a first serving gateway (SGW) included in the first service domain, wherein at least some of the messaging is associated with requesting allocation of an Internet Protocol (IP) address for the mobile station that is attached to a wireless access network of the first service domain, wherein the home agent is in the second service domain associated with a different wireless access network type than the first service domain, wherein the sending comprises sending at least one message of the messaging through a GRE (Generic Routing Encapsulation) tunnel;

receiving, from the home agent, the Internet Protocol (IP) address allocated to the mobile station in the second service domain effective to enable a first proxy binding associated with the first SGW and the PDN gateway, wherein the IP address is allocated in response to the messaging, and wherein the first proxy binding is effective to enable anchoring services provided to the mobile station in the second service domain;

sending, to the home agent, messaging associated with a second SGW included in the first service domain; and maintaining a second proxy binding with the second SGW, wherein the second proxy binding is based at least in part on using the same IP address assigned by the home agent to the mobile station.

2. The method of claim 1 further comprising determining an IP address to use for communicating with the home agent.

3. The method of claim 2, wherein determining the IP address associated with the home agent further comprises selecting the home agent from a plurality of home agents based, at least in part, on load balancing.

4. The method of claim 2, wherein determining an IP address to use for communicating with the home agent further comprises using out-of-band signaling with a server to select the home agent.

5. The method of claim 1, wherein sending messaging to the home agent further comprises sending at least some Dynamic Host Configuration Protocol (DHCP) messaging.

6. The method of claim 1, wherein prior to sending messaging to the home agent, the method further comprises:
   determining whether a current GRE tunnel exists between the PDN gateway and the home agent; and
   responsive to determining a current GRE tunnel does not exist between the PDN gateway and the home agent, establishing the GRE tunnel.

7. The method of claim 1, wherein the first wireless domain comprises an Evolved UMTS (Universal Mobile Telecommunications System) Terrestrial Radio Access Network (E-UTRAN) wireless network.

8. A packet data network (PDN) gateway device associated with a first service domain and configured to enable a mobile station operating in the first service domain to access one or more services anchored in a second service domain, the PDN gateway device comprising:
   at least one processor; and
   one or more computer-readable storage memory devices comprising processor-executable instructions which, responsive to execution by the at least one processor, are configured to enable the PDN gateway device to perform operations comprising:
   sending, to a home agent, messaging associated with a first serving gateway (SGW) included in the first service domain, wherein at least some of the messaging is associated with requesting allocation of an Internet Protocol (IP) address for the mobile station that is attached to a wireless access network of the first service domain, wherein the home agent is in the second service domain associated with a different wireless access network type than the first service domain, wherein the sending comprises sending at least one message of the messaging through a GRE (Generic Routing Encapsulation) tunnel;
   receiving, from the home agent, the Internet Protocol (IP) address allocated to the mobile station in the second service domain effective to enable a first proxy binding associated with the first SGW and the PDN gateway, wherein the IP address is allocated in response to the messaging, and wherein the first proxy binding is effective to enable anchoring services provided to the mobile station in the second service domain;
   sending, to the home agent, messaging associated with a second SGW included in the first service domain; and
   maintaining a second proxy binding with the second SGW, wherein the second proxy binding is based at least in part on using the same IP address assigned by the home agent to the mobile station.

9. The PDN gateway device of claim 8 further configured to perform operations comprising:
   determining an IP address to use for communicating with the home agent.

10. The PDN gateway device of claim 9, wherein determining an IP address to use for communicating with the home agent further comprises selecting the home agent from a plurality of home agents based, at least in part, on load balancing.

11. The PDN gateway device of claim 9, wherein determining an IP address to use for communicating with the home agent further comprises using out-of-band signaling with a server to select the home agent.

12. The PDN gateway device of claim 8, wherein sending messaging to the home agent further comprises sending at least some Dynamic Host Configuration Protocol (DHCP) messaging.

13. The PDN gateway device of claim 8, wherein prior to sending messaging to the home agent, the PDN gateway device is further configured to perform operations comprising:
   determining whether a current GRE tunnel exists between the PDN gateway and the home agent; and
   responsive to determining a current GRE tunnel does not exist between the PDN gateway and the home agent, establishing the GRE tunnel.

14. The PDN gateway device of claim 8, wherein the first wireless domain comprises an Evolved UMTS (Universal Mobile Telecommunications System) Terrestrial Radio Access Network (E-UTRAN) wireless network.

15. One or more computer-readable storage memory devices comprising processor-executable instructions which, responsive to execution by at least one processor of a packet data network (PDN) gateway device associated with a first service domain, are configured to enable the PDN gateway device to enable a mobile station operating in the first service domain to access one or more services anchored in a second service domain by performing operations comprising:
   sending, to a home agent, messaging associated with a first serving gateway (SGW) included in the first service domain, wherein at least some of the messaging is associated with requesting allocation of an Internet Protocol (IP) address for the mobile station that is attached to a wireless access network of the first service domain, wherein the home agent is in the second service domain associated with a different wireless access network type than the first service domain, wherein the sending comprises sending at least one message of the messaging through a GRE (Generic Routing Encapsulation) tunnel;
   receiving, from the home agent, the Internet Protocol (IP) address allocated to the mobile station in the second service domain effective to enable a first proxy binding associated with the first SGW and the PDN gateway, wherein the IP address is allocated in response to the messaging, and wherein the first proxy binding is effective to enable anchoring services provided to the mobile station in the second service domain;

sending, to the home agent, messaging associated with a second SGW included in the first service domain; and maintaining a second proxy binding with the second SGW, wherein the second proxy binding is based at least in part on using the same IP address assigned by the home agent to the mobile station.

16. The one or more computer-readable storage memory devices of claim 15, wherein the processor-executable instructions are further configured to enable the PDN gateway device to perform operations comprising:

determining an IP address to use for communicating with the home agent.

17. The one or more computer-readable storage memory devices of claim 16, wherein determining an IP address to use for communicating with the home agent further comprises selecting the home agent from a plurality of home agents based, at least in part, on load balancing.

18. The one or more computer-readable storage memory devices of claim 16, wherein determining an IP address to use for communicating with the home agent further comprises using out-of-band signaling with a server to select the home agent.

19. The one or more computer-readable storage memory devices of claim 15, wherein sending messaging to the home agent further comprises sending at least some Dynamic Host Configuration Protocol (DHCP) messaging.

20. The one or more computer-readable storage memory devices of claim 15, wherein prior to sending messaging to the home agent, the processor-executable instructions are further configured to enable the PDN gateway device to perform operations comprising:

determining whether a current GRE tunnel exists between the PDN gateway and the home agent; and responsive to determining a current GRE tunnel does not exist between the PDN gateway and the home agent, establishing the GRE tunnel.

\* \* \* \* \*